(12) United States Patent
Singh et al.

(10) Patent No.: US 9,295,081 B1
(45) Date of Patent: Mar. 22, 2016

(54) ORTHOGONAL FREQUENCY DIVISION MULTIPLEXING (OFDM) COMMUNICATION SYSTEM AND METHOD TO SCHEDULE TRANSFERS OF FIRST AND SECOND USER COMMUNICATIONS

(71) Applicant: Sprint Communications Company L.P., Overland Park, KS (US)

(72) Inventors: Jasinder Pal Singh, Olathe, KS (US); Maulik K. Shah, Austin, TX (US); Siddharth Oroskar, Overland Park, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 168 days.

(21) Appl. No.: 14/242,613

(22) Filed: Apr. 1, 2014

(51) Int. Cl.
*H04W 4/00* (2009.01)
*H04W 74/04* (2009.01)

(52) U.S. Cl.
CPC .................................. *H04W 74/04* (2013.01)

(58) Field of Classification Search
CPC ....................................................... H04W 74/04
See application file for complete search history.

(56) References Cited

U.S. PATENT DOCUMENTS

| 8,472,379 B2 | 6/2013 | Ishii et al. | |
| 2011/0222406 A1* | 9/2011 | Persson | H04L 47/12 370/236 |
| 2012/0140633 A1* | 6/2012 | Stanwood | H04L 47/2458 370/235 |
| 2013/0148597 A1* | 6/2013 | Lee | H04W 72/1226 370/329 |
| 2013/0188566 A1 | 7/2013 | Zhu et al. | |
| 2014/0126358 A1* | 5/2014 | Bedekar | H04W 28/24 370/230 |
| 2014/0286256 A1* | 9/2014 | Chowdhury | H04L 47/56 370/329 |
| 2015/0036592 A1* | 2/2015 | Yoshida | H04L 47/6215 370/328 |
| 2015/0131545 A1* | 5/2015 | Ameigeiras Gutierrez | H04W 72/087 370/329 |
| 2015/0264707 A1* | 9/2015 | Golderer | H04W 72/087 370/329 |

* cited by examiner

*Primary Examiner* — Clemence Han

(57) ABSTRACT

An Orthogonal Frequency Division Multiplexing (OFDM) communication system and method to schedule transfers of first and second user communications between the FDM communication system and a Wireless Communication Device (WCD) are provided. The OFDM communication system in one example includes an OFDM scheduling system to process Quality-of-Service Class Identifiers (QCIs) and determine if the first user communication having a first QCI can be scheduled subsequently and if the second user communication having a second QCI can be scheduled in place of the first user communication, and if the first user communication can be scheduled subsequently and the second user communication should be scheduled in place of the first user communication, then schedule the second user communication in place of the first user communication. An OFDM transceiver wirelessly transfers the second user communication in place of the first user communication between the OFDM communication system and the WCD based on scheduling.

20 Claims, 7 Drawing Sheets

ORTHOGONAL FREQUENCY DIVISION MULTIPLEXING (OFDM) COMMUNICATION SYSTEM AND METHOD TO SCHEDULE TRANSFERS OF FIRST AND SECOND USER COMMUNICATIONS

TECHNICAL BACKGROUND

Communications being exchanged within a wireless communication network can be prioritized, especially when traffic levels become heavy. When multiple Wireless Communication Devices (WCDs) are exchanging communications within a wireless communication network, communications latency can increase. As a result, some communications may be given a higher priority than other communications. For example, data communications for a particular WCD are typically given a lower priority than voice communications for that particular WCD. Wireless communication providers typically give priority to voice communications, as subscribers expect voice communications to be transmitted without delay. As a result, during times of heavy traffic, data communications may be delayed, including being significantly and noticeably delayed in some instances.

The Long Term Evolution (LTE) communication protocol provides a Quality-of-Service (QoS) for a given communication application by selecting an appropriate communication bearer as given by a QoS Class Identifier (QCI) value. Each bearer has its own QCI. The QCI value is a scalar value that denotes a specific packet-forwarding behavior to be provided by the selected communication bearer. QCI values can be used for congestion control, for example, wherein the communications traffic of some users can be affected in order to provide better communications for other users.

The QCI value of an associated LTE or Voice over LTE (VoLTE) bearer determines how the communication bearer is scheduled. The QCI value specifies communication characteristics such as resource types, priority levels, packet delay budgets, and packet error loss rates. The QCI value therefore determines the bandwidth, priority, and other resources to be provided to a communication bearer.

Each QCI value is associated with specific communication levels or types. For example, a QCI value of 1 is associated with conversational voice communications. A QCI value of 2 is associated with conversational video (live streaming). A QCI value of 3 is associated with non-conversational video (buffered streaming). A QCI value of 8 is associated with TCP-based data communications (www, e-mail, chat, FTP, P2P, et cetera).

However, where a particular WCD is exchanging both voice and data communications, it is desired that the data communications not significantly lag behind the voice communications. Such lag occurs where prioritization of communications in the wireless communication network is done purely on the basis of voice communications being prioritized over data communications.

Overview

An Orthogonal Frequency Division Multiplexing (OFDM) communication system and method configured to schedule transfers of first and second user communications between the OFDM communication system and a Wireless Communication Device (WCD) are provided. The OFDM communication system in one example includes an OFDM scheduling system configured to process Quality-of-Service Class Identifiers (QCIs) for the first and second user communications to determine if the first user communication having a first QCI can be scheduled subsequently and if the second user communication having a second QCI can be scheduled in place of the first user communication by re-allocating an OFDM Resource Block (RB) from the first user communication to the second user communication, and if the first user communication can be scheduled subsequently and if the second user communication should be scheduled in place of the first user communication, then schedule the second user communication in place of the first user communication. The OFDM communication system in one example includes an OFDM transceiver coupled to the OFDM scheduling system and configured to wirelessly transfer the second user communication in place of the first user communication between the OFDM communication system and the WCD based on the scheduling.

DETAILED DESCRIPTION

Figure 1:
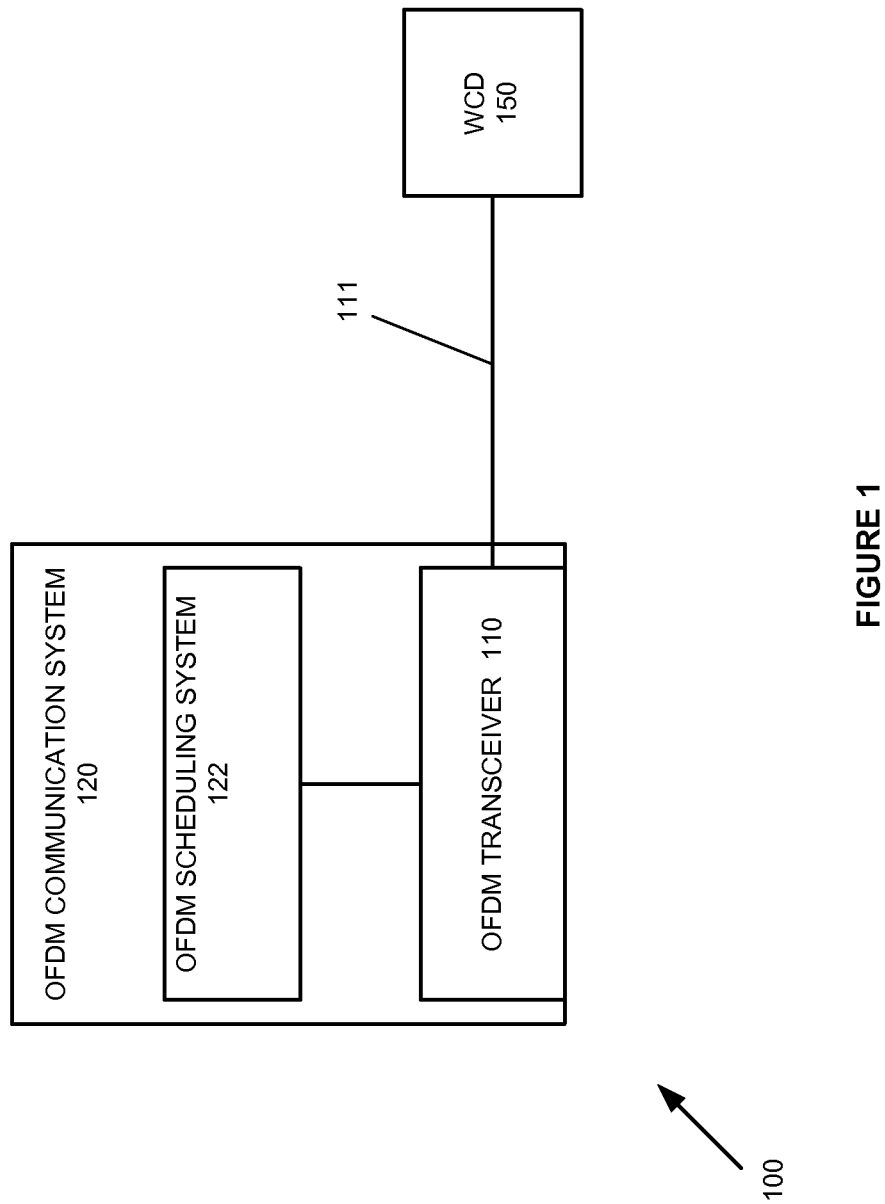
FIG. 1 illustrates a wireless communication system to schedule transfers of first and second user communications.

FIG. 1 illustrates a wireless communication system 100 to schedule transfers of first and second user communications. The wireless communication system 100 comprises an Orthogonal Frequency Division Multiplexing (OFDM) communication system 120 and a Wireless Communication Device (WCD) 150 that exchanges wireless communications with the OFDM communication system 120 via a wireless link 111. The OFDM communication system 120 schedules transfers of first and second user communications between the OFDM communication system 120 and the WCD 150. Although a single WCD 150 is shown, it should be understood that any number of WCDs 150 can exchange communications with the OFDM communication system 120.

The OFDM communication system 120 includes an OFDM transceiver 110 and an OFDM scheduling system 122 coupled to the OFDM transceiver 110, among other components. The OFDM communication system 120 comprises an enhanced Node B (eNB) 120 in some examples. The OFDM transceiver 110 receives the first and second user communications. The first and second user communications comprise user communications associated with the WCD 150, but having different Quality-of-Service Class Identifier (QCI) values. The first user communication has an associated first QCI value. The second user communication has an associated second QCI value. The first and second QCI values determine how the first and second user communications are scheduled by the OFDM scheduling system 122. However, in some circumstances, the first and second user communications are not scheduled strictly according to their respective QCI values, as is discussed below.

The communications being exchanged by the OFDM communication system 120 can be prioritized, especially when traffic levels become heavy. Communications latency can increase, with the result that some communications will be given a higher priority than other communications, including the multiple communications related to the single WCD 150.

For the particular WCD 150, the voice communications being exchanged with the OFDM communication system 120 will typically be given a higher priority than the data communications of the WCD 150. The voice and data communications include communications being transferred to the WCD 150 and communications being transferred from the WCD 150. As a result, if the user of the WCD 150 is exchanging both voice and data communications with the OFDM communication system 120, the data communications may lag in order for the voice communications to be given a higher priority and therefore faster and better delivery. For example, voice communications or live streaming video communications are typically given a higher priority than buffered video and TCP-based communications.

The Long Term Evolution (LTE) communication protocol provides a Quality-of-Service (QoS) for a given communication application by selecting an appropriate communication bearer. Each bearer has its own QCI. The QCI value is a scalar value that denotes a specific packet-forwarding behavior to be provided by the selected communication bearer. QCI values are used for congestion control, for example, wherein the communications traffic of some users can be affected in order to provide better communications for other users.

The QCI value of an associated LTE or Voice over LTE (VoLTE) bearer determines how the communication bearer is scheduled. The QCI value specifies communication characteristics such as resource types, priority levels, packet delay budgets, and packet error loss rates. The QCI value therefore determines the bandwidth, priority, and other resources to be provided to a communication bearer.

Each QCI value is associated with specific communication levels or types. For example, a QCI value of 1 is associated with conversational voice communications. A QCI value of 2 is associated with conversational video (live streaming). A QCI value of 3 is associated with non-conversational video (buffered streaming). A QCI value of 8 is associated with TCP-based data communications (www, e-mail, chat, FTP, P2P, et cetera).

The resource type comprises Guaranteed Bit Rate (GBR) or non-GBR communications for each QCI level. GBR bearers have an associated GBR value for which dedicated transmission resources are permanently allocated at bearer establishment or modification. Non-GBR bearers do not guarantee any particular bit rate, and no bandwidth resources are permanently allocated to a non-GBR bearer. Typically, a high-priority GBR bearer, such as for QCI values 1 and 2 (i.e., conversational voice and conversational video) will be scheduled sooner and given priority over user communications having QCI values of 6 or 8 (buffered video or TCP-based communications).

It may be possible for a first user communication to be delayed. The OFDM scheduling system 122 determines whether the first user communication can be delayed by inspecting the packet delay budget of the first QCI, i.e., $QCI_1$. For example, for a $QCI_1$ value of 1, the packet delay budget is typically 100 milliseconds (ms) and for a $QCI_1$ value of 2, the packet delay budget is typically 150 ms. If the packet delay budget has not been consumed, then the first user communication can be delayed. It should be understood that voice communications (such as communications with QCI values of 1-3, for example) are typically given a higher priority (and more RBs) than is needed to adequately transfer voice communications. Therefore, in many cases it may be possible to delay the first user communication. If the first user communication can be delayed, then the second user communication can be scheduled in place of the first user communication.

Figure 2:
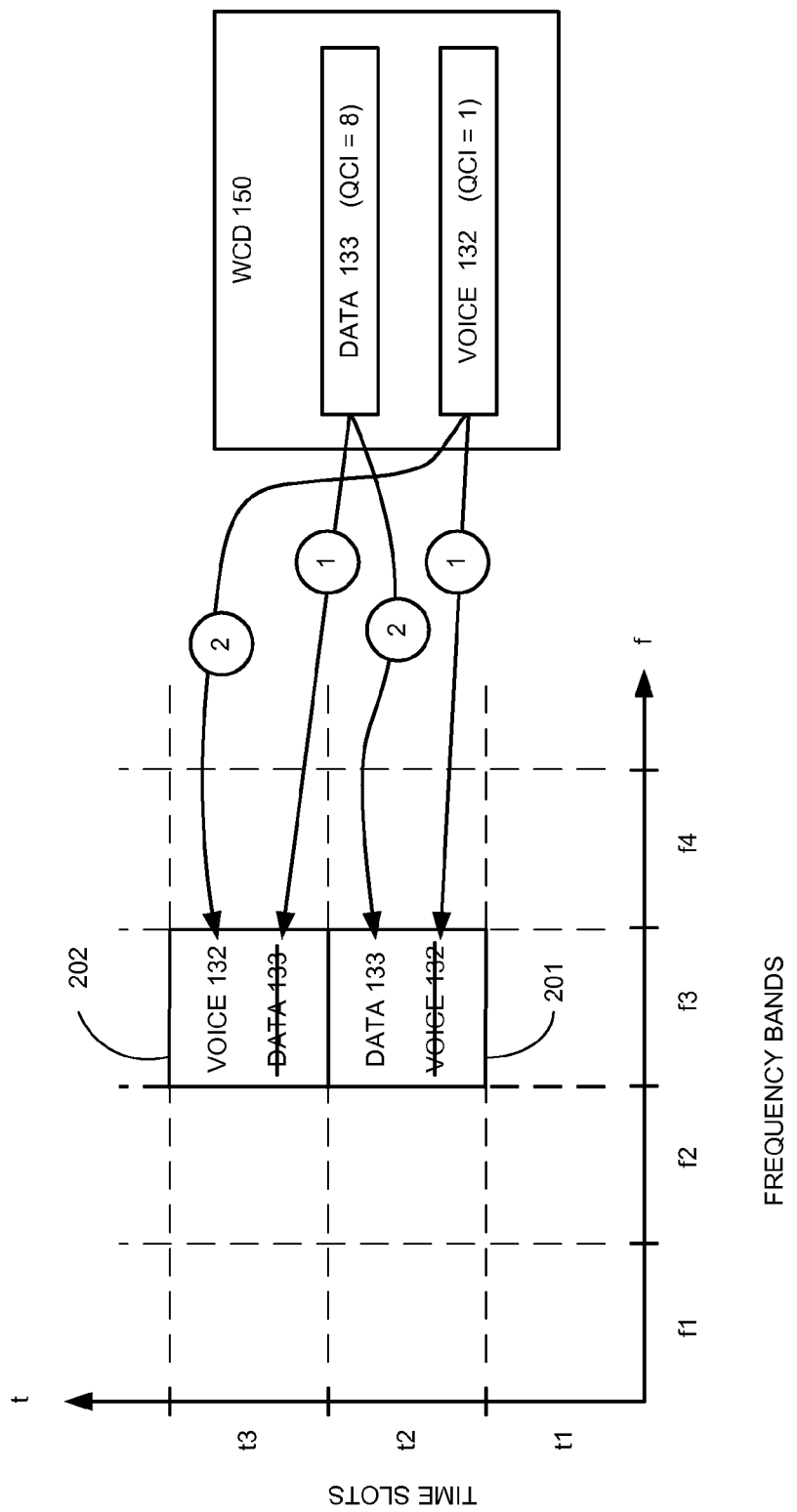
FIG. 2 is a chart of OFDM time slots versus frequency bands.

FIG. 2 is a chart of OFDM RBs that are scheduled according to time slots and frequency bands. The RBs 201 and 202 are available to be scheduled with a first user communication 132 and a second user communication 133 for the WCD 150. The first user communication 132 in this example comprises a voice communication having a QCI=1 value, while the second user communication 133 comprises a data communication having a QCI=8 value.

The arrows labeled "1" show a default scheduling, with the default scheduling being performed strictly to QCI values of the first user communication 132 and the second user communication 133. Because the first user communication 132 has a higher priority QCI value, and comprises a GBR QCI value, the first user communication 132 is scheduled in the RB 201 at an earlier time slot t2. The second user communication 133 is scheduled in the RB 202 at the later time slot t3.

The arrows labeled "2" show a scheduling where the first user communication 132 is replaced by the second user communication 133. The second user communication 133 is now scheduled in the RB 201 in the earlier time slot t2, while the first user communication 132 is scheduled in the RB 203 in the later time slot t3.

Figure 3:
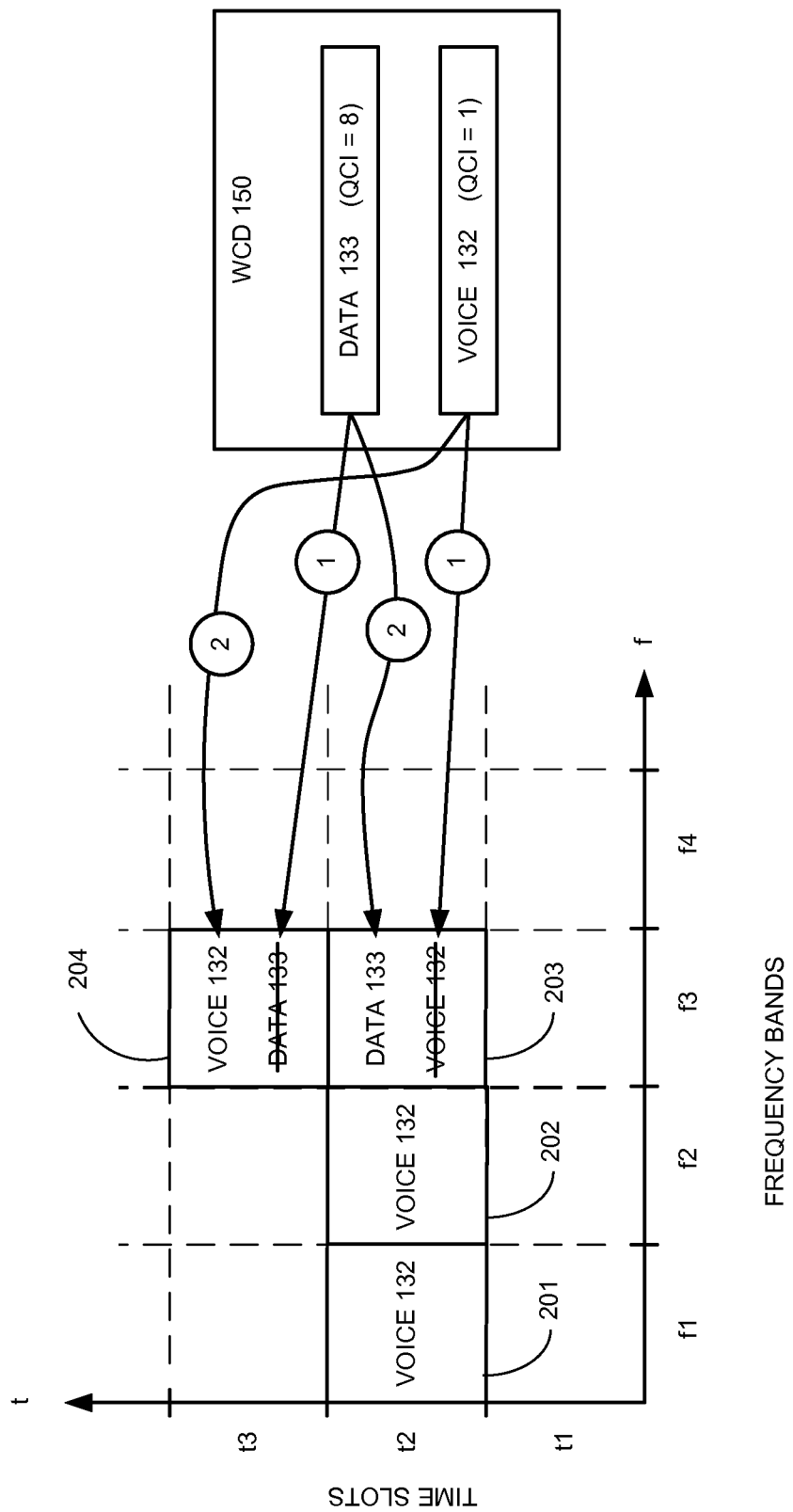
FIG. 3 is a chart of OFDM time slots versus frequency bands.

FIG. 3 is a chart of OFDM RBs that are scheduled according to time slots and frequency bands. In this example, carrier aggregation (CA) is being performed, wherein the WCD 150 has been allocated multiple communication resources. In this example, three RBs 201-203 are scheduled for the first user communication 132, and are scheduled to be transferred employing three frequency bands f1-f3 in the time slot t2. In addition, the second user communication 133 has been allocated to the later time slot t3.

The arrows labeled "1" again show a default scheduling, with the default scheduling being performed strictly to QCI values of the first user communication 132 and the second user communication 133. Because the first user communication 132 has a higher priority QCI value, and comprises a GBR QCI value, the first user communication 132 is scheduled in the three CA RBs 201-203 at the earlier time slot t2. The second user communication 133 is scheduled in the RB 204 at the later time slot t3.

The arrows labeled "2" again show a scheduling where the first user communication RB 203 is replaced by the second user communication 133. The second user communication 133 is now scheduled in the RB 201 in the earlier time slot t2, while the corresponding first user communication 132 is scheduled in the RB 203 in the later time slot t3.

Referring again to FIG. 1, in some examples, the OFDM scheduling system 122 is configured to process QCI values for the first and second user communications to determine if a first user communication having a first QCI can be scheduled subsequently and if a second user communication having a second QCI can be scheduled in place of the first user communication. If the first user communication can be scheduled subsequently and if the second user communication should be scheduled in place of the first user communication, then the OFDM scheduling system 122 schedules the second user communication in place of the first user communication. The second user communication can be scheduled in place of the first user communication by re-allocating an OFDM Resource Block (RB) from the first user communication to the second user communication. Further, the OFDM scheduling system 122 is configured to direct the OFDM transceiver 110 to wirelessly transfer the second user communication in place of the first user communication based on the scheduling.

In some examples, the first QCI comprises a guaranteed bit-rate (GBR) QCI value and the second QCI comprises a non-guaranteed bit-rate (non-GBR) QCI value. GBR bearers have an associated GBR value for which dedicated transmission resources are permanently allocated at bearer establishment or modification. Non-GBR bearers do not guarantee any particular bit rate, and no bandwidth resources are permanently allocated to a non-GBR bearer.

In some examples, the first QCI comprises ($QCI_1$=1) or ($QCI_1$=2) (conversational voice or conversational video), and the second QCI comprises ($QCI_2$=8) (TCP-based communications), wherein the OFDM scheduling system 122 schedules the second user communication in place of the first user communication. The first user communication is scheduled subsequently. As a result, the second user communication ($QCI_2$=8), whether being transmitted by the OFDM communication system 120 or being received by the OFDM communication system 120, is scheduled to have a higher priority than the first user communication ($QCI_1$=1) or ($QCI_1$=2).

In some examples, the OFDM scheduling system 122 is configured to determine if the first user communication having the first QCI can be scheduled subsequently comprises processing the first QCI and the second QCI to determine if the first QCI qualifies for enhanced scheduling. In some examples, the OFDM scheduling system 122 is further configured to determine if the second user communication having the second QCI can be scheduled in place of the first user communication comprises processing the first QCI and the second QCI to determine if the second user communication qualifies for enhanced scheduling.

In some examples, the OFDM scheduling system 122 is configured to determine if the first user communication having the first QCI can be scheduled subsequently comprises determining latency status for the first user communication. In some examples, a packet delay budget for the QCI value determines how much latency will be tolerated in the associated communication bearer.

In some examples, the OFDM scheduling system 122 is further configured to determine if the first user communication having the first QCI can be scheduled subsequently comprises determining error status for the first user communication. The error status can comprise determining whether an actual error rate exceeds the packet error loss rate that is given in the associated QCI value.

In some examples, the OFDM scheduling system 122 is configured to determine if the second user communication can be scheduled in place of the first user communication comprises determining latency status for the second user communication, as previously discussed for the first user communication. In some examples, the OFDM scheduling system 122 is further configured to determine if the second user communication can be scheduled in place of the first user communication comprises determining error status for the second user communication, as previously discussed for the first user communication.

Figure 4:
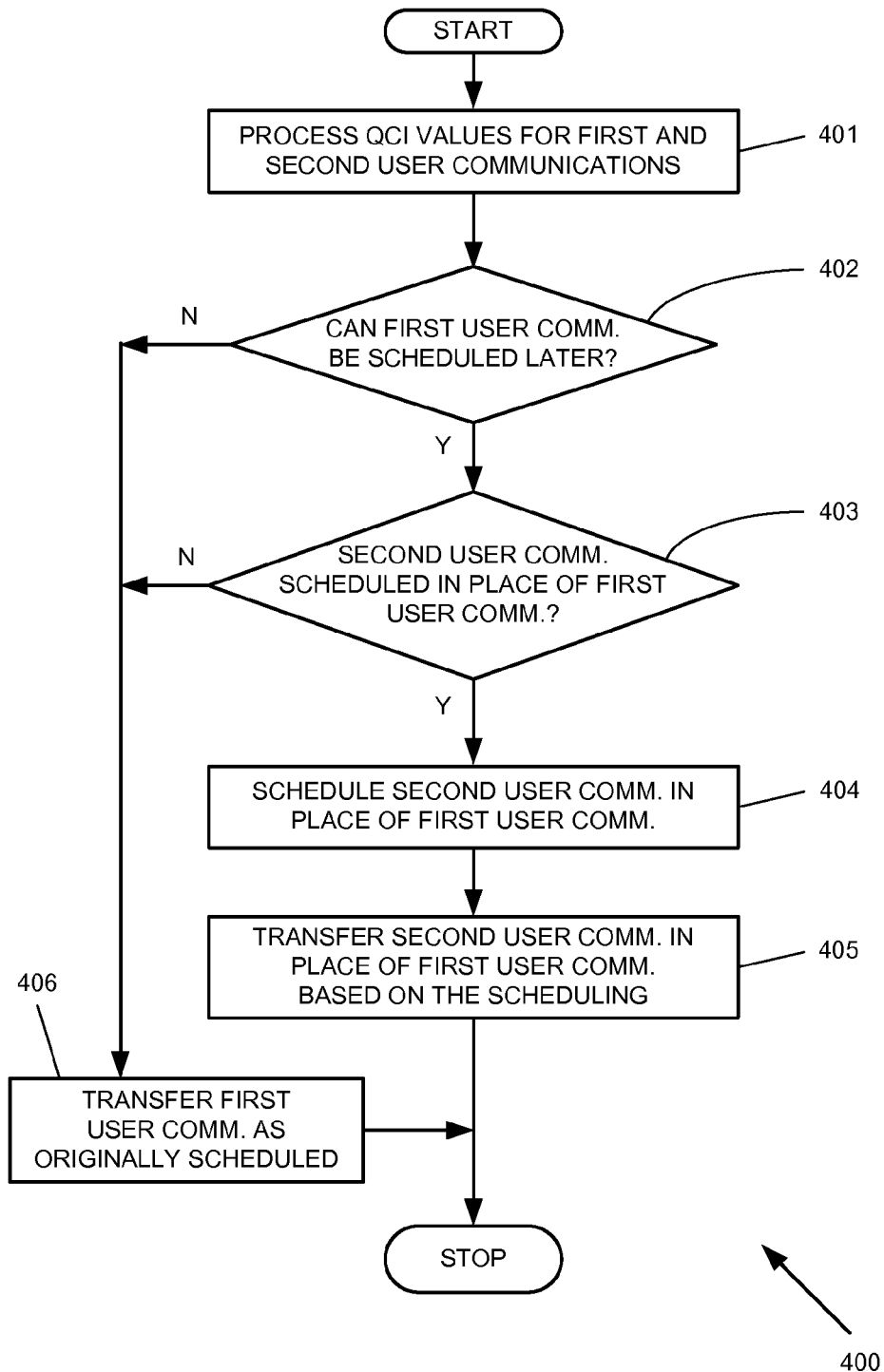
FIG. 4 illustrates a method of operating an OFDM communication system to schedule transfers of first and second user communications.

FIG. 4 illustrates a method of operating an OFDM communication system to schedule transfers of first and second user communications. In some examples, the OFDM communication system comprises a wireless communication system that is capable of exchanging wireless communications and scheduling transfers of the first and second user communications according to a LTE and/or VoLTE communication protocol. In step 401, an OFDM scheduling system of the OFDM communication system processes first and second QCIs of the first and second user communications.

In step 402, the OFDM scheduling system determines if the first user communication having the first QCI can be scheduled subsequently (i.e., whether the first user communication can be delayed). The determination can depend at least in part on the first QCI value for the first user communication, in some examples. If the first user communication can be scheduled subsequently, then the method proceeds to step 403. Otherwise, the method branches to step 406.

In some examples, determining if the first user communication having the first QCI can be scheduled subsequently comprises processing the first QCI and the second QCI to determine if the first QCI qualifies for enhanced scheduling. The determining in some examples comprises QCI pair matching, such as the first $QCI_1$ comprising a value of 1 or 2 and the second $QCI_2$ comprising a value of 8.

In some examples, determining if the first user communication can be scheduled subsequently comprises determining latency status for the first user communication. In some examples, a packet delay budget for the QCI value determines how much latency will be tolerated in the associated communication bearer.

In some examples, determining if the first user communication having the first QCI can be scheduled subsequently comprises determining error status for the first user communication. The error status can comprise determining whether an actual error rate exceeds the packet error loss rate that is given in the associated QCI value. If the actual error rate does not exceed the given packet error loss rate, then the first user communication can be determined to be capable of being scheduled subsequently.

In step 403, the OFDM scheduling system determines if a second user communication having a second QCI can be scheduled in place of the first user communication (i.e., whether the second user communication can be advanced). The determination can depend at least in part on the second QCI value for the second user communication in some examples. If the second user communication can be scheduled in place of the first user communication, then the method proceeds to step 404. Otherwise, the method branches to step 406.

In some examples, determining if the second user communication can be scheduled in place of the first user communication comprises determining latency status for the second user communication, as previously discussed for the first user communication. In some examples, determining if the second user communication can be scheduled in place of the first user communication comprises determining error status for the second user communication, as previously discussed for the first user communication. In some examples, determining if the second user communication having the second QCI can be scheduled in place of the first user communication comprises processing the first QCI and the second QCI to determine if the second QCI qualifies for enhanced scheduling.

In some examples, the first QCI comprises a guaranteed bit-rate (GBR) QCI and the second QCI comprises a non-guaranteed bit-rate (non-GBR) QCI.

In some examples, the first QCI comprises ($QCI_1$=1) or ($QCI_1$=2) (conversational voice or conversational video), and the second QCI comprises ($QCI_2$=8) (TCP-based communications), wherein the OFDM scheduling system can schedule the second user communication in place of the first user communication. The first user communication is scheduled subsequently. As a result, the second user communication ($QCI_2$=8), whether being transmitted by the OFDM communication system or being received by the OFDM communication system, is scheduled to have a higher priority than the first user communication ($QCI_1=1$) or ($QCI_1=2$).

In step 404, where the first user communication can be scheduled subsequently and the second user communication can be scheduled in place of the first user communication, the OFDM scheduling system schedules the second user communication in place of the first user communication. In some examples, the OFDM scheduling system schedules the second user communication in place of the first user communication by re-allocating an OFDM Resource Block (RB) from the first user communication to the second user communication.

In step 405, an OFDM transceiver of the OFDM communication system wirelessly transfers the second user communication in place of the first user communication between the OFDM communication system and the WCD, based on the scheduling.

In step 406, where either the first user communication could not be scheduled subsequently or the second user communication could not be advanced, the OFDM transceiver transfers the first user communication as originally scheduled. If more user communications remain to be processed, the method loops back to step 401 and repeats.

Figure 5:
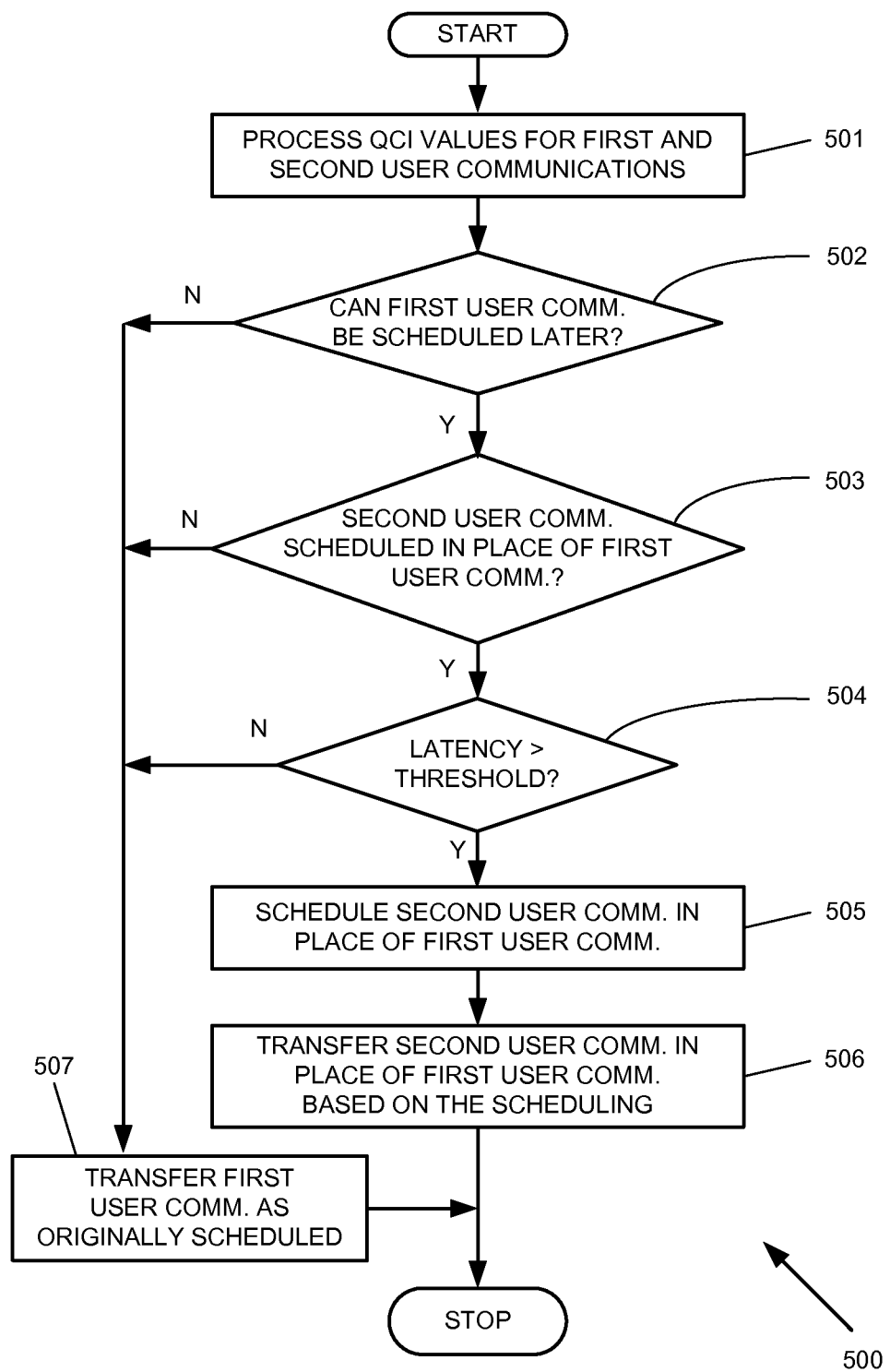
FIG. 5 illustrates a method of operating an OFDM communication system to schedule transfers of first and second user communications.

FIG. 5 illustrates a method of operating an OFDM communication system to schedule transfers of first and second user communications. In step 501, an OFDM scheduling system of the OFDM communication system processes first and second QCIs of the first and second user communications, as previously discussed.

In step 502, the OFDM scheduling system determines if the first user communication having the first QCI can be scheduled subsequently, as previously discussed. If the first user communication can be scheduled subsequently, then the method proceeds to step 503. Otherwise, the method branches to step 507.

In some examples, determining if the first user communication having the first QCI can be scheduled subsequently comprises processing the first QCI and the second QCI to determine if the first QCI qualifies for enhanced scheduling, as previously discussed. Alternatively, or in addition, determining if the first user communication having the first QCI can be scheduled subsequently comprises determining error status for the first user communication, as previously discussed.

In step 503, the OFDM scheduling system determines if a second user communication having a second QCI can be scheduled in place of the first user communication, as previously discussed. If the second user communication can be scheduled in place of the first user communication, then the method proceeds to step 504. Otherwise, the method branches to step 507.

In step 504, if a communication latency value exceeds a predetermined latency threshold, then the method proceeds to step 505. As a result, scheduling of user communications can be modified when the communication latency value exceeds the predetermined latency threshold. Otherwise, where the communication latency value does not exceed the predetermined latency threshold, the method branches to step 507.

In step 505, where the first user communication can be scheduled subsequently and the second user communication can be scheduled in place of the first user communication, the OFDM scheduling system schedules the second user communication in place of the first user communication, as previously discussed.

In step 506, an OFDM transceiver of the OFDM communication system wirelessly transfers the second user communication in place of the first user communication between the OFDM communication system and the WCD, based on the scheduling.

In step 507, where either the first user communication could not be scheduled subsequently or the second user communication could not be advanced, the OFDM transceiver transfers the first user communication as originally scheduled. If more user communications remain to be processed, the method loops back to step 501 and repeats.

Figure 6:
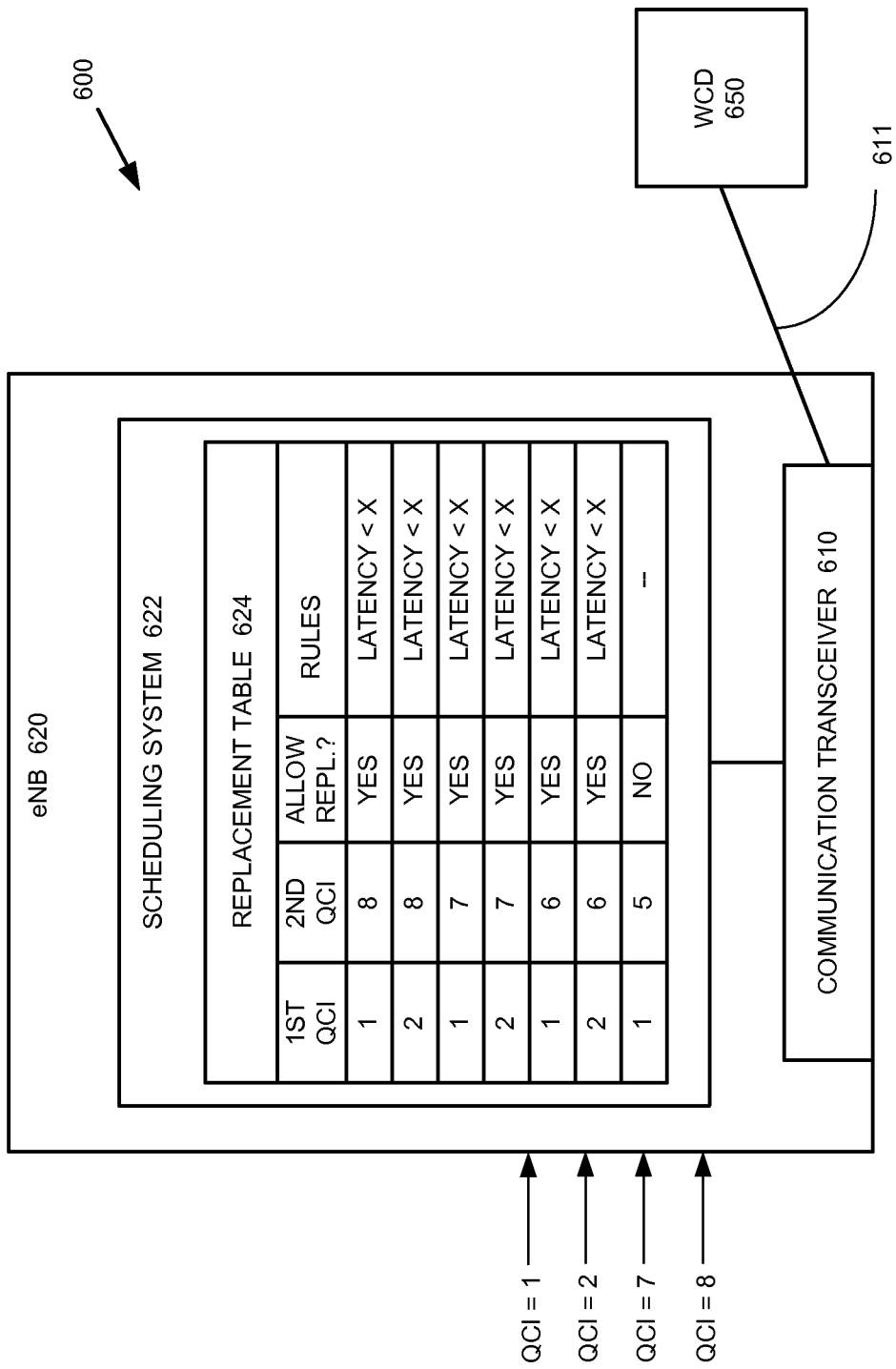
FIG. 6 illustrates a wireless communication system to schedule transfers of first and second user communications.

FIG. 6 illustrates a wireless communication system 600 to schedule transfers of first and second user communications. The wireless communication system 600 comprises an evolved Node B (eNB) 620 and at least one WCD 650 that exchanges wireless communications with the eNB 620 via a wireless link 611. The eNB 620 schedules transfers of first and second user communications between the eNB 620 and the WCD 650. The eNB 620 is an example of system 120, although these systems may use alternative configurations and operations.

In addition to the above components, the eNB 620 includes a communication transceiver 610 and a scheduling system 622 coupled to the communication transceiver 610, among other components. The communication transceiver 610 receives the first and second user communications. The first and second user communications comprise first and second user communications associated with the WCD 650, but having different QCI values. The scheduling system 622 processes the first and second QCI values for the first and second user communications to determine if a first user communication having a first QCI can be scheduled subsequently and if a second user communication having a second QCI can be scheduled in place of the first user communication. If the first user communication can be scheduled subsequently and if the second user communication should be scheduled in place of the first user communication, then the scheduling system 622 schedules the second user communication in place of the first user communication. The second user communication can be scheduled in place of the first user communication by re-allocating an OFDM Resource Block (RB) from the first user communication to the second user communication. The communication transceiver 610 wirelessly transfers the second user communication in place of the first user communication based on the scheduling.

The scheduling system 622 includes a replacement table 624. The replacement table 624 comprises a data structure that is used to determine whether, for a particular user, a first user communication can be replaced by a second user communication. The scheduling system 622 uses the replacement table 624 to determine, where at least two user communications exist for a particular user, whether the first user communication can be replaced by the second user communication of that user.

The replacement table 624 comprises rows and columns, wherein a row is accessed by matching received first and second QCIs to first and second QCI entries of a row. In operation, the first and second QCI values are used in order to find a row of the replacement table 624. For example, if the first user communication has a $QCI_1=1$ and the second user communication has a $QCI_2=7$, then the third row of the replacement table 624 will be accessed in the example. The third row will then be used to determine if the first user communication can be replaced by the second user communication.

Each row includes an allow replacement entry that indicates whether the first user communication can be replaced by the second user communication. In the example for the third row, where $QCI_1=1$ and where $QCI_2=7$, the allow replacement entry is "yes" and the first user communication can be replaced by the second user communication.

Each row further includes a rules entry that stipulates a rule or rules that must be satisfied before the first user communication can be replaced by the second user communication. A rule given in the example for the third row is that a latency value must be less than a predetermined value. In an example, the rule specifies that the first user communication's latency must be less than a predetermined maximum latency, as specified by $QCI_1=1$. The latency value can comprise a latency value typically associated with that QCI level (i.e., a $QCI_1=1$ may be associated with a maximum latency of 100 milliseconds), or can comprise a latency value imposed by the operator of the eNB 620.

Alternatively, or in addition the rule can specify that the second user communication's latency must be greater than a predetermined maximum latency, as specified by $QCI_2=7$. In an example, the replacement does not occur unless the second user communication is experiencing excessive delay. The latency value can comprise a latency value typically associated with that QCI level (i.e., a $QCI_2=7$ may be associated with a maximum latency of 300 milliseconds), or can comprise a latency value imposed by the operator of the eNB 620.

Further, the rules entry can specify an error status for the first and/or second user communications. The error status must additionally be satisfied for replacement to occur. The error status can comprise determining whether an actual error rate exceeds a packet error loss rate that is given in the associated QCI value.

Figure 7:
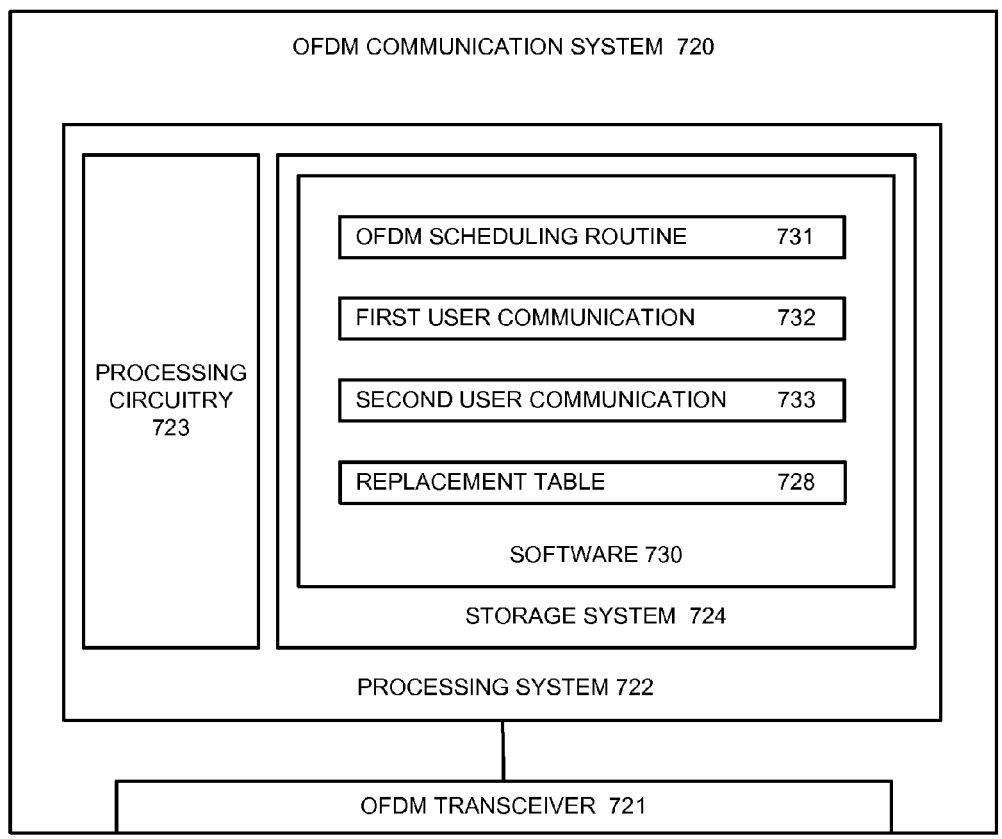
FIG. 7 illustrates an OFDM communication system to schedule transfers of first and second user communications.

FIG. 7 illustrates an OFDM communication system 720 to schedule transfers of first and second user communications. The OFDM communication system 720 schedules transfers of first and second user communications between the OFDM communication system 720 and a WCD 150 or 650. The OFDM communication system 720 is an example of systems 120 and 620, although these systems may use alternative configurations and operations. The OFDM communication system 720 comprises a processing system 722 coupled to an OFDM transceiver 721. The processing system 722 comprises processing circuitry 723 and a storage system 724. The storage system 724 stores software 730. The software 730 includes software modules 731-733. Some conventional aspects of the OFDM communication system 720 are omitted for clarity, such as power supplies, enclosures, and the like. The OFDM communication system 720 may be centralized or distributed and may include various virtualized components.

In the processing system 722, the processing circuitry 723 comprises circuit boards, integrated circuitry, and associated electronics. The storage system 724 comprises non-transitory, machine-readable, data storage media, such as flash drives, disc drives, memory circuitry, servers, and the like. The software 730 comprises machine-readable instructions that control the operation of the processing circuitry 723 when executed. The software 730 includes the software modules 731-733 and may also include operating systems, applications, utilities, databases, and the like. All or portions of the software 730 may be externally stored on one or more storage media, such as flash drives, discs, servers, and the like.

When executed by the processing circuitry 723, the OFDM scheduling module 731 directs the processing circuitry 723 to process QCIs for the first and second user communications 732 and 733 to determine if the first user communication 732 having a first QCI can be scheduled subsequently and if the second user communication 733 having a second QCI can be scheduled in place of the first user communication 732 by re-allocating an OFDM Resource Block (RB) from the first user communication 732 to the second user communication 733. When executed by the processing circuitry 723, the OFDM scheduling routine module 731 directs the processing circuitry 723 to schedule the second user communication 733 in place of the first user communication 732 if the first user communication 732 can be scheduled subsequently and if the second user communication 733 should be scheduled in place of the first user communication 732. When executed by the processing circuitry 723, the replacement table module 728 directs the processing circuitry 723 to compare the first $QCI_1$ and the second $QCI_2$ to entries in a replacement table and therefore determine whether the first user communication can be replaced by the second user communication.

The OFDM transceiver 721 comprises communication components, such as ports, signal processing circuitry, memory, software, and the like. The OFDM transceiver 721 wirelessly transfers the second user communication 733 in place of the first user communication 732 between the OFDM communication system 720 and the WCD 150 or 650 based on the scheduling.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An Orthogonal Frequency Division Multiplexing (OFDM) communication system to schedule transfers of first and second user communications between the OFDM communication system and a Wireless Communication Device (WCD), comprising:
   an OFDM scheduling system configured to process Quality-of-Service Class Identifiers (QCIs) for the first and second user communications to determine if the first user communication having a first QCI can be scheduled subsequently and if the second user communication having a second QCI can be scheduled in place of the first user communication by re-allocating an OFDM Resource Block (RB) from the first user communication to the second user communication, and if the first user communication can be scheduled subsequently and if the second user communication should be scheduled in place of the first user communication, then schedule the second user communication in place of the first user communication; and
   an OFDM transceiver coupled to the OFDM scheduling system and configured to wirelessly transfer the second user communication in place of the first user communication between the OFDM communication system and the WCD based on the scheduling.

2. The OFDM communication system of claim 1, with the OFDM scheduling system further configured to determine if the first user communication having the first QCI can be scheduled subsequently comprises determining latency status for the first user communication.

3. The OFDM communication system of claim 1, with the OFDM scheduling system further configured to determine if the first user communication having the first QCI can be scheduled subsequently comprises determining error status for the first user communication.

4. The OFDM communication system of claim 1, with the OFDM scheduling system further configured to determine if the first user communication having the first QCI can be scheduled subsequently comprises processing the first QCI and the second QCI to determine if the first QCI qualifies for enhanced scheduling.

5. The OFDM communication system of claim 1, with the OFDM scheduling system further configured to determine if the second user communication can be scheduled in place of the first user communication comprises determining latency status for the second user communication.

6. The OFDM communication system of claim 1, with the OFDM scheduling system further configured to determine if the second user communication can be scheduled in place of the first user communication comprises determining error status for the second user communication.

7. The OFDM communication system of claim 1, with the OFDM scheduling system further configured to determine if the second user communication having the second QCI can be scheduled in place of the first user communication comprises processing the first QCI and the second QCI to determine if the second QCI qualifies for enhanced scheduling.

8. The OFDM communication system of claim 1, wherein the first QCI comprises a guaranteed bit-rate (GBR) QCI and wherein the second QCI comprises a non-guaranteed bit-rate (non-GBR) QCI.

9. The OFDM communication system of claim 1, wherein the first QCI comprises one of ($QCI_1=1$) and ($QCI_1=2$) and wherein the second QCI comprises ($QCI_2=8$).

10. The OFDM communication system of claim 1, wherein the OFDM communication system comprises a Long Term Evolution (LTE) eNode B (eNB).

11. A method of operating an Orthogonal Frequency Division Multiplexing (OFDM) communication system to schedule transfers of first and second user communications between the OFDM communication system and a Wireless Communication Device (WCD), comprising:
  in an OFDM scheduling system, processing Quality-of-Service Class Identifiers (QCIs) for the first and second user communications to determine if the first user communication having a first QCI can be scheduled subsequently and if the second user communication having a second QCI can be scheduled in place of the first user communication by re-allocating an OFDM Resource Block (RB) from the first user communication to the second user communication;
  in the OFDM scheduling system, if the first user communication can be scheduled subsequently and if the second user communication should be scheduled in place of the first user communication, then scheduling the second user communication in place of the first user communication; and
  in an OFDM transceiver, wirelessly transferring the second user communication in place of the first user communication between the OFDM communication system and the WCD based on the scheduling.

12. The method of claim 11, wherein determining if the first user communication having the first QCI can be scheduled subsequently comprises determining latency status for the first user communication.

13. The method of claim 11, wherein determining if the first user communication having the first QCI can be scheduled subsequently comprises determining error status for the first user communication.

14. The method of claim 11, wherein determining if the first user communication having the first QCI can be scheduled subsequently comprises processing the first QCI and the second QCI to determine if the first QCI qualifies for enhanced scheduling.

15. The method of claim 11, wherein determining if the second user communication can be scheduled in place of the first user communication comprises determining latency status for the second user communication.

16. The method of claim 11, wherein determining if the second user communication can be scheduled in place of the first user communication comprises determining error status for the second user communication.

17. The method of claim 11, wherein determining if the second user communication having the second QCI can be scheduled in place of the first user communication comprises processing the first QCI and the second QCI to determine if the second QCI qualifies for enhanced scheduling.

18. The method of claim 11, wherein the first QCI comprises a guaranteed bit-rate (GBR) QCI and wherein the second QCI comprises a non-guaranteed bit-rate (non-GBR) QCI.

19. The method of claim 11, wherein the first QCI comprises one of ($QCI_1=1$) and ($QCI_1=2$) and wherein the second QCI comprises ($QCI_2=8$).

20. A method of operating an Orthogonal Frequency Division Multiplexing (OFDM) communication system to schedule transfers of first and second user communications between the OFDM communication system and a Wireless Communication Device (WCD), comprising:
  in an OFDM scheduling system, processing Quality-of-Service Class Identifiers (QCIs) for the first and second user communications to determine if the first user communication having a first QCI can be scheduled subsequently and if the second user communication having a second QCI can be scheduled in place of the first user communication by re-allocating an OFDM Resource Block (RB) from the first user communication to the second user communication;
  in the OFDM scheduling system, comparing a communication latency value to a predetermined latency threshold;
  in the OFDM scheduling system, if the communication latency value exceeds the predetermined latency threshold and if the first user communication can be scheduled subsequently and if the second user communication should be scheduled in place of the first user communication, then scheduling the second user communication in place of the first user communication; and
  in an OFDM transceiver, wirelessly transferring the second user communication in place of the first user communication between the OFDM communication system and the WCD based on the scheduling.

* * * * *